Patented June 15, 1937

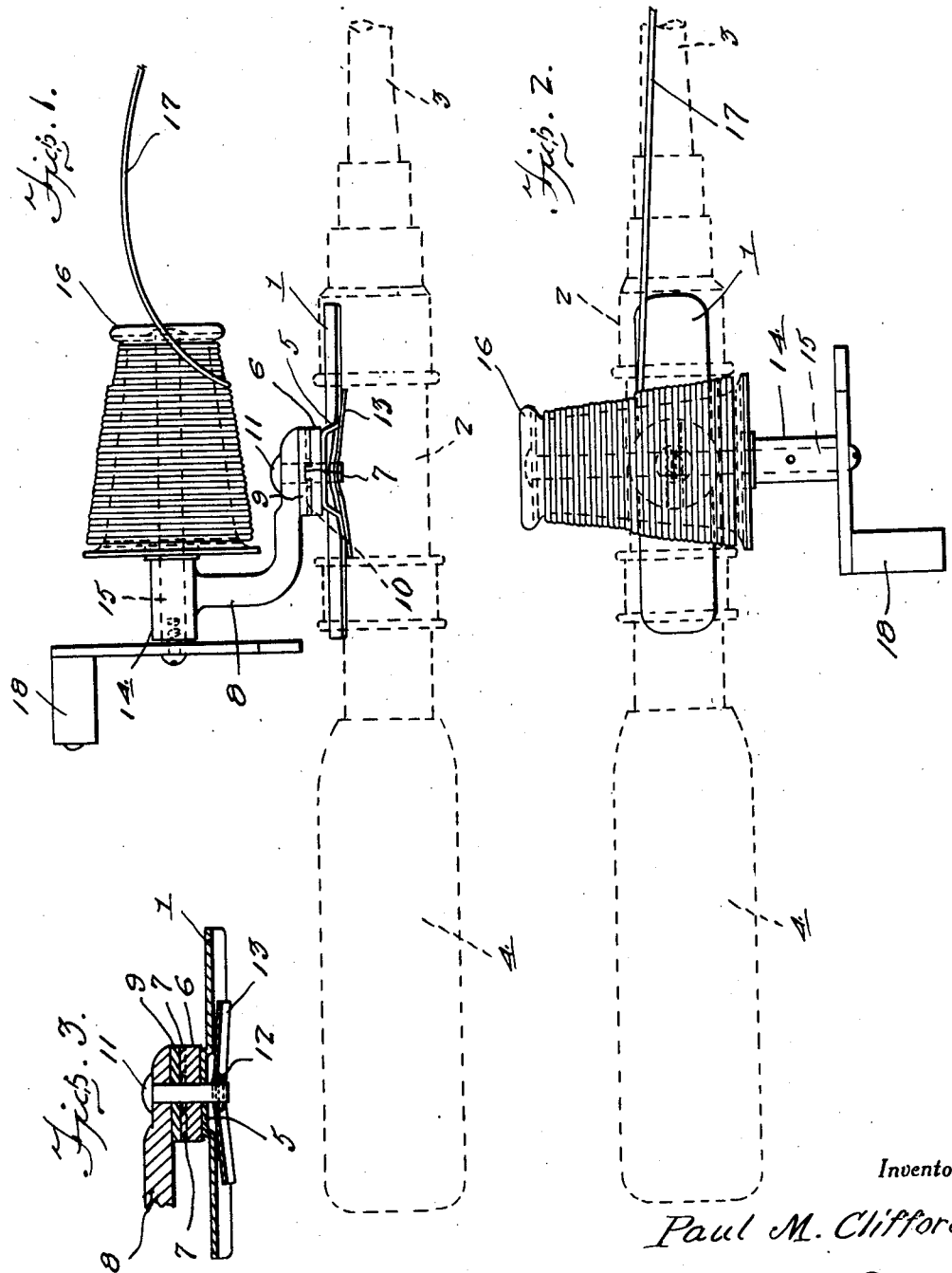

2,083,689

UNITED STATES PATENT OFFICE 2,083,689

FISHING REEL

Paul M. Clifford, Green Bay, Wis.

Application September 1, 1936, Serial No. 98,939

2 Claims. (Cl. 242—84.1)

The present invention relates to new and useful improvements in fishing reels, and has for its primary object to provide, in a manner as hereinafter set forth, a device of this character embodying a novel construction and arrangement through the medium of which casting and rewinding will be considerably facilitated and simplified.

Another very important object of the invention is to provide, in a fishing reel of the type including a conical spool which is adapted to be disposed parallel with or transversely to the pole, novel means for mounting said spool on the pole and securing said spool in either position.

Other objects of the invention are to provide a fishing reel of the aforementioned character which will be comparatively simple in construction, strong, durable, highly efficient and reliable in use, compact, light in weight, attractive in appearance, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1 is a view in side elevation of the invention, showing the spool positioned parallel with the pole.

Fig. 2 is a top plan view, showing the spool positioned transversely with respect to the pole.

Fig. 3 is a fragmentary view in vertical longitudinal section, showing the means for adjustably mounting the spool on the pole.

Referring now to the drawing in detail, it will be seen that the embodiment of the invention has been illustrated comprises an elongated metallic plate 1 of arcuate cross section which is adapted to be secured in the usual manner on the butt portion 2 of a pole 3. The reference numeral 4 designates the usual handle of the pole. Of course, the plate 1 is mounted longitudinally on the pole.

The plate 1 includes a raised, substantially flat intermediate portion 5 having fixed thereon a circular metallic base 6. On its upper surface, the base 6 has formed a plurality of integral, radial ribs 7.

The reference numeral 8 designates an angular metallic arm having fixed on one end portion a disk 9 which is rotatably mounted on the base 6. The disk 9 has formed in its lower face a plurality of radial grooves 10 for the reception of the ribs 7. The disk 9 is rotatably secured on the base 6 by a pivot pin 11 which extends vertically through one end portion of the arm 8, said disk 9 and said base 6 and has its lower end rotatably secured by a pin 12 (see Fig. 3) in a longitudinal strip 13 of resilient metal which bridges the raised intermediate portion 5 of the plate 1. The resilient metallic strip 13 constitutes a spring, the end portions of which bear against the lower side of the plate 1 at the opposite ends of the raised intermediate portion 5 of said plate.

On its other end, the arm 8 is provided with a horizontal bearing 14 in which a shaft 15 is journalled. The reference numeral 16 designates a substantially conical spool which is fixed on the shaft 15. The line which is wound on the spool 16 is designated by the reference numeral 17. An operating crank 18 is secured on one end of the shaft 15.

It is thought that the operation of the invention will be readily apparent from a consideration of the foregoing. When the line is to be cast, the spool 16 is turned to a position parallel with the pole 3, as seen in Fig. 1 of the drawing. When in this position, the line 17 will unwind freely and rapidly from the spool 16 over the small end thereof. When the line is to be rewound, the spool 16 is rotated to a transverse position with respect to the pole, as seen in Fig. 2, and said spool is then actuated through the medium of the crank 18. As the spool is rotated one-quarter of a revolution between its two positions, the spring 13 yields sufficiently to permit the disk 9 to rise and rotate on the ribs 7 until the desired position is reached, after which said ribs again snap into the grooves 10 for releasably securing said spool in adjusted position.

It is believed that the many advantages of a fishing reel constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. A fishing reel comprising a plate adapted to be fixedly secured on a fishing pole, an arm rotatably mounted on said plate, a substantially conical spool rotatably mounted on said arm, means for manually actuating the spool, coacting means on the plate and the arm for releasably securing said arm in adjusted position, the last-named means including a substantially flat, circular base fixed on the plate, radial ribs rising from said base, a disk fixed on the arm and rotatably engaged on the base, said disk having radial grooves therein for the reception of the ribs, a pivot element extending through the base and the disk, and resilient means connected to said pivot element for yieldingly urging the disk against the base.

2. A fishing reel comprising an elongated plate of arcuate cross section adapted to be secured on a fishing pole, said plate including a raised, substantially flat intermediate portion, a substantially flat, circular base fixed on said raised intermediate portion, radial ribs rising from said base, an angular arm, a disk fixed on one end portion of said angular arm and rotatably engaged on the base, said disk having radial grooves therein for the reception of the ribs, a pivot element extending through said one end portion of the arm, the disk, the base and the raised intermediate portion of the plate, a resilient metallic strip rotatably mounted on one end portion of said pivot element and engaged beneath the plate, said strip traversing the raised intermediate portion of the plate, said strip constituting means for yieldingly urging the disk against the base, a substantially conical spool rotatably mounted on the other end of the arm, and a crank for actuating said spool.

PAUL M. CLIFFORD.